United States Patent

[11] 3,570,436

| [72] | Inventor | Craig Le Vasseur<br>8924 Earhart Ave., Los Angeles, Calif. 90045 |
|---|---|---|
| [21] | Appl. No. | 819,799 |
| [22] | Filed | Apr. 28, 1969 |
| [45] | Patented | Mar. 16, 1971 |

[54] SUBMERSIBLE WATER BICYCLE
4 Claims, 4 Drawing Figs.

| [52] | U.S. Cl. | 114/16, 115/26.3 |
|---|---|---|
| [51] | Int. Cl. | B63g 8/00, B63h 16/12 |
| [50] | Field of Search | 115/27, 26.3; 114/16, 16 (A) |

[56] References Cited

UNITED STATES PATENTS

| 919,134 | 4/1909 | Crepeau | 115/27 |
| 1,393,117 | 10/1921 | Halfpenny | 115/26.3 |
| 3,101,691 | 8/1963 | Wendt | 114/16(A) |

FOREIGN PATENTS

| 614,348 | 12/1960 | Italy | 115/26.3 |

*Primary Examiner*—Trygve M. Blix
*Attorney*—Jessup & Beecher

ABSTRACT: A submersible water bicycle is provided for use by scuba divers, and others, so that they may propel themselves easily and comfortably beneath the surface of the water at any desired depth. The vehicle includes an inertial wheel which may be brought up to speed to provide a measure of momentum to the vehicle and a gyroscope effect to maintain the vehicle in a desired angular position with respect to its longitudinal axis.

Patented March 16, 1971

INVENTOR:
Craig LeVasseur
Jessup and Beecher

By Keith D. Beecher
ATTORNEYS

Patented March 16, 1971

INVENTOR:
Craig LeVasseur

By Keith D. Beecher
ATTORNEYS

SUBMERSIBLE WATER BICYCLE

BACKGROUND OF THE INVENTION

Water bicycles are known to the art whereby a person either by foot pedals or by a hand crank, or both, may drive a propellor and move the bicycle through the water. However, there does not appear to be any such vehicle in the prior art which is constructed to be easily submersible, as is the case of the vehicle of this invention, and which may be easily and comfortably propelled at any desired depth beneath the water, or which includes an inertial wheel to sustain momentum.

DETAILED DESCRIPTION OF THE ILLUSTRATED EMBODIMENT

Figure 1:
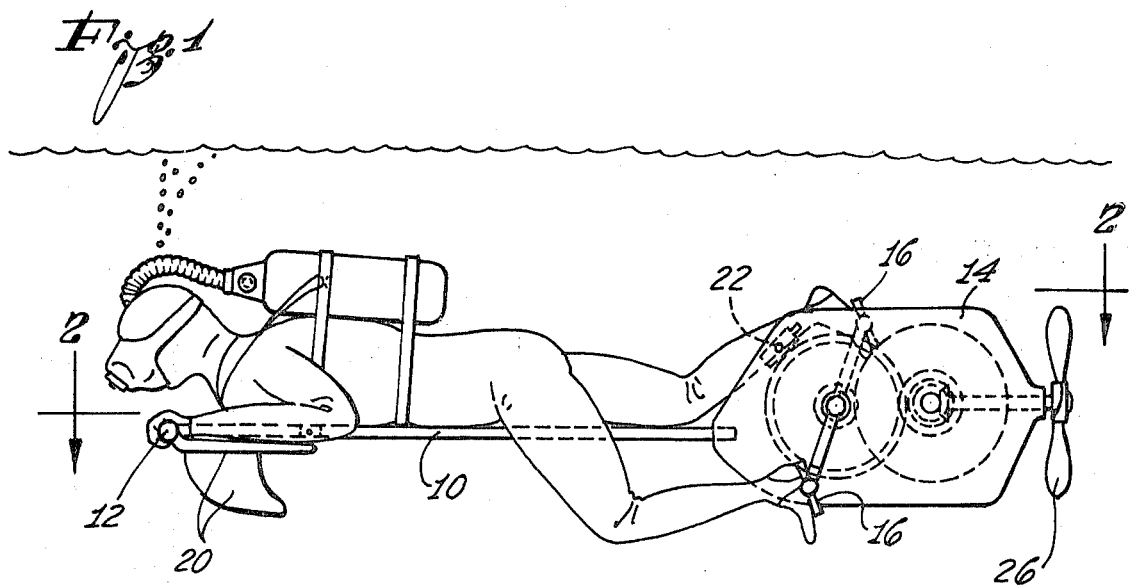
FIG. 1 is a side elevation view of one embodiment of the improved submersible water bicycle of the present invention, and also showing the bicycle being operated by a scuba diver.
Figure 2:
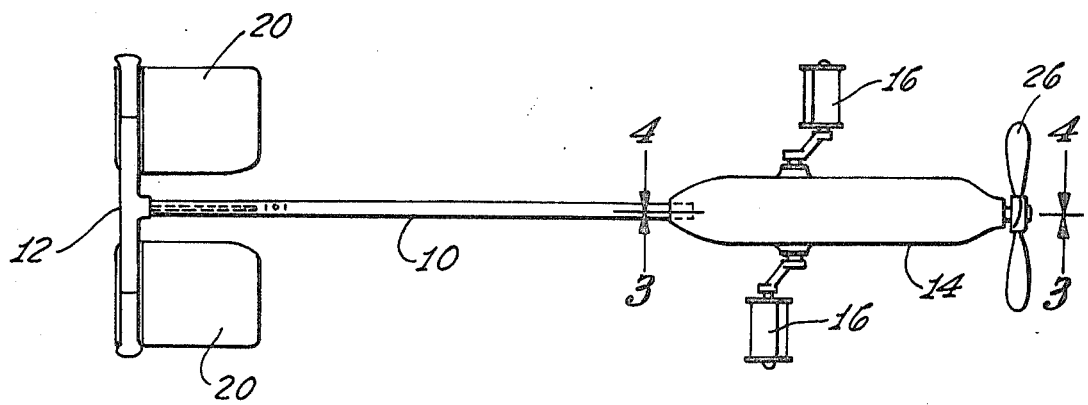
FIG. 2 is a plan view of the bicycle of FIG. 1 taken substantially along the line 2-2 of FIG. 1, but without the scuba diver.

As shown in the accompanying drawings, the water bicycle in the illustrated embodiment includes an elongated frame 10 having a transverse handle 12 at its forward end, and including a watertight compartment 14 at its rear end. A pair of pedals 16 is mounted on a transverse shaft 18 extending through the housing of the compartment 14.

The submersible water bicycle of the invention is intended to be operated, as best shown in FIG. 1, by a scuba diver, for example, lying face downward on the frame 10 with his feet on the pedals 16, and with his hands grasping the transverse handle 12.

A pair of submersion control members 20 is pivotally mounted on the handle 12, and these members may each have an arcuate shape, as best shown in FIG. 1, so as to serve as submersible control surfaces. The diver controls the angular position of the members 20, and thereby may turn them to a fully extended position, such as shown in FIG. 1, so as to cause the vehicle to be directed down into the water for a maximum dive inclination. Then, when a desired depth below the water has been achieved, the diver may control the angular position of the control members 20 so as to level out at any particular depth.

An electric or other type of motor 22 may be included in the compartment 14 to serve either as an assist for the pedals 16, or as the sole means to drive the vehicle, or as the sole means to produce and sustain momentum of the inertia wheel.

Figure 3:
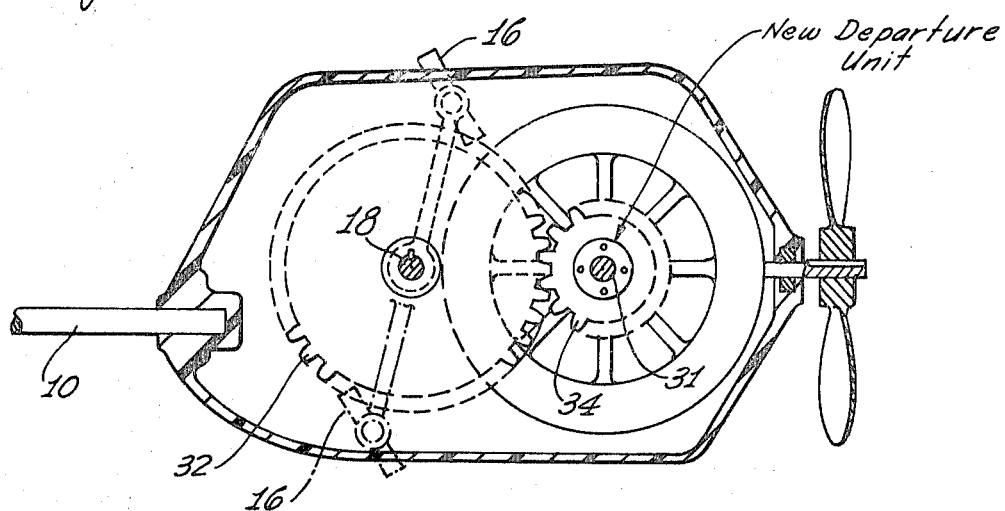
FIG. 3 is a side section of the rear portion of the bicycle taken, for example, along the line 3-3 of FIG. 2.
Figure 4:
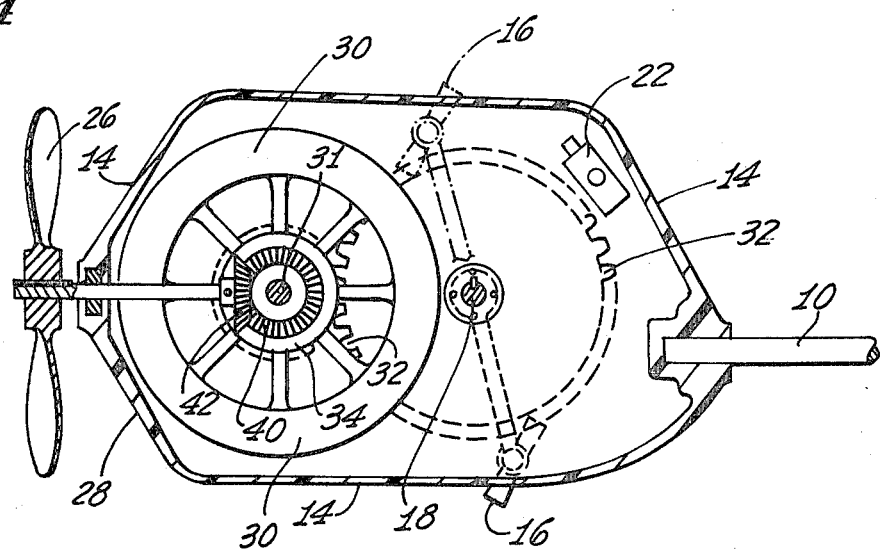
FIG. 4 is a side section of the rear portion of the bicycle, taken from the opposite side, and essentially along the line 4-4 of FIG. 2.

The propulsion of the vehicle is effectuated by a propellor 26 which is mounted on the rear end of the frame 10. As best shown in FIGS. 3 and 4, for example, the propellor 26 is mounted on a rotatable shaft 28. The shaft 28 extends into the compartment 14, as shown in FIGS. 3 and 4, through an appropriate water seal at one end of the housing of the compartment.

An inertial wheel 30 is rotatably mounted within the compartment 14 on a shaft 31. As shown in FIG. 3, the pedals 16 drive a gear 32 which is mounted on the shaft 18, and the gear 32 engages a further gear 34 which is mounted on the shaft 31 of the inertial wheel 30. Therefore, when the pedals 16 are actuated, the inertial wheel 30 is rotatably driven about its shaft 31 and is brought up to speed, at which it exhibits a desirable flywheel effect, as well as providing a gyroscopic action to maintain the vehicle in a desired position, as illustrated in FIG. 1.

As shown in FIG. 4, for example, a bevel gear 40 is mounted on the other side of the inertial wheel 30, and the gear 40 meshes with a further bevel gear 42 which is mounted on the drive shaft 28. Therefore, as the pedals 16 rotate their drive shaft 18 and gear 32, the inertial wheel 30 is rotated and drives the propellor 26 through the gears 40 and 42. The coupling between the pedals and the inertial wheel is preferably like that of a usual bicycle, termed "New Departure," by which the inertial wheel may be brought up to speed and permitted to rotate freely independent of the pedals.

It will be appreciated, of course, that other couplings may be used between the pedals and the inertial wheel, and between the inertial wheel and the drive shaft. For example, a chain and sprocket drive may be used, or other equivalent drives.

The improved vehicle of the present invention is advantageous in that it is simple and straightforward in its construction, so that it may be made at a relatively low cost and sold at a relatively low price. The vehicle is rugged in its construction, and it entails a relatively few parts, so as to be virtually trouble-free. Moreover, the vehicle is easy to operate and control, and may be guided in a simple manner to any desired depth below the surface of the water.

I claim:

1. A submersible water bicycle including: a frame; a drive shaft rotatably mounted on said frame; a propellor mounted at one end of said drive shaft and driven thereby; a housing mounted on said frame and forming a watertight compartment; an inertial member rotatably mounted on said frame within said watertight compartment for rotation about an axis transverse to the axis of rotation of said drive shaft and mechanically coupled to said drive shaft; and drive means mechanically coupled to said inertial member to enable said intertial member to be brought up to speed and then permitting said inertial member to rotate freely independent of said drive means.

2. The combination defined in claim 1, in which said drive means includes pedals rotatably mounted on said frame and mechanically coupled to said inertial member to drive said inertial member.

3. The combination defined in claim 1, and which includes a handle mounted on said frame and extending transversely to the longitudinal axis thereof, and a pair of arcuately shaped members pivotally connected to said handle on opposite sides of said frame and manually controllable to different angular positions for controlling the submersion of the water bicycle.

4. The combination defined in claim 1, in which said drive means includes a drive motor.